United States Patent
Siggers

[15] 3,648,402
[45] Mar. 14, 1972

[54] INSECT SWATTER

[72] Inventor: Reuben A. Siggers, P.O. Box 105, Institute, W. Va. 25112

[22] Filed: Feb. 11, 1970

[21] Appl. No.: 10,322

[52] U.S. Cl. ..................................................43/137
[51] Int. Cl. ................................................A01m 3/02
[58] Field of Search ..........................43/137, 136, 135, 134

[56] References Cited

UNITED STATES PATENTS

| | | | |
|---|---|---|---|
| 1,501,467 | 7/1924 | Rairden | 43/137 |
| 2,207,963 | 7/1940 | White | 43/137 |

Primary Examiner—Warner H. Camp
Attorney—Edward G. Atkins

[57] ABSTRACT

An insect swatter comprising a handle, an enclosed loop attached to one end of the handle and a swatter blade pivotally mounted on the enclosed loop and adapted to freely rotate 360° within the loop.

8 Claims, 4 Drawing Figures

PATENTED MAR 14 1972
3,648,402
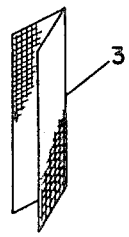
FIGURE 2
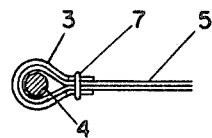
FIGURE 3
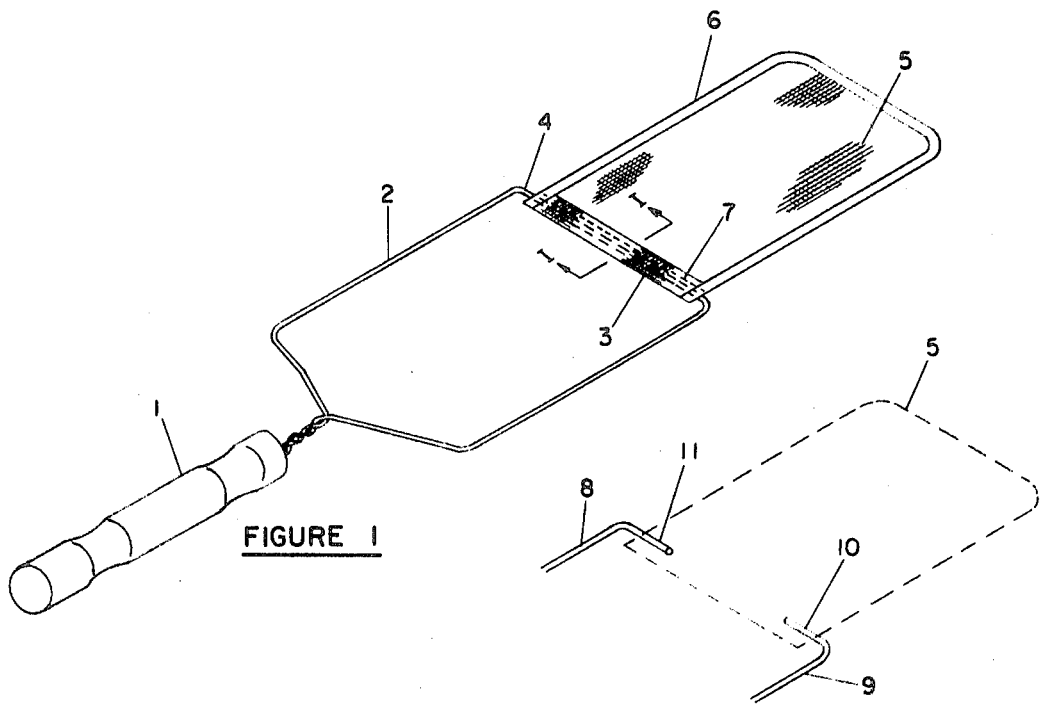
REUBEN A. SIGGERS
INVENTOR
Edward G. Atkins
PATENT ATTORNEY

INSECT SWATTER

BACKGROUND OF THE INVENTION

1. Field of the Invention

This invention relates to insect swatters and particularly to insect swatters having hinged or pivotally mounted swatter blades. More particularly this invention relates to an insect swatter which is pivotally mounted in such a manner as to freely rotate 360° about an axis.

2. Description of the Prior Art

Various insect swatters have been devised with a hingedly or pivotally attached swatter element. Typical of these are the swatters depicted in the patents of Pitts (U.S. Pat. No. 1,217,212) and Sarantos (U.S. Pat. No. 1,984,436). In Pitts the swatter blade rotated only about 120°. In Sarantos a complete rotation of the blade was obstructed by the handle. In no instance has an insect swatter been designed to rotate unencumbered.

SUMMARY OF THE INVENTION

An insect swatter has now been designed which in operation allows the swatter blade to rotate freely about an axis unencumbered by the swatter handle or any other element of the swatter. Such an insect swatter comprises: a handle, an enclosed loop attached to one end of said handle, and a striker blade pivotally mounted on said enclosed loop and adapted to rotate 360° within the loop.

In normal use the swatter is held in an upright or perpendicular position with the blade portion of the swatter contained within the enclosed loop and hanging freely from its pivot or hinge point. A quick downward snap of the wrist toward the intended target causes the swatter blade to rotate out from within the loop and strike the surface on which the intended target rests. The additional advantage of this device over other similar hinged swatters is that if the target insect is missed and the blade encounters no other obstacle, the momentum of the swing carries the blade full circle so that a second attempt can be made without an appreciable loss of time. Another advantage of this arrangement is that the swatter range is extended by the length of the swatter blade and when the device is not in use the blade can be retained within the loop thus saving space. This invention can be extremely useful in attacking insects found on tops of overhead light fixtures and in like places where insects are not subject to attack by ordinary rigid insect swatters. It is also be noted that this invention can be of particular value to physically handicapped persons not having the full use of their arms.

BRIEF DESCRIPTION OF THE DRAWING

FIG. 1 is a perspective view of an insect swatter constructed in accordance with the description included herein with the striking blade fully extended in one extreme position.

FIG. 2 is a simple pictorial of the reinforcing element.

FIG. 3 is an enlarged view taken along the section I—I of FIG. 1.

FIG. 4 is a partial pictorial view of an alternate construction of the insect swatter.

DESCRIPTION OF THE PREFERRED EMBODIMENTS

Referring now to FIG. 1, the device is shown comprising a wire loop 2 formed from a single wire with the ends of the wire twisted and firmly attached to the wooden handle 1. The enclosed loop 2 encloses an area slightly larger than striker blade 5. The loop may be trapezoidal in shape with the smaller base forming the pivot axis and the larger base attached to the handle.

The swatter blade 5, usually rectangular in shape, is preferably formed from a layer of wire mesh bent about pivot axis 4 forming a blade having two layers of mesh. The pivot axis 4 is perpendicular to handle 1 and also perpendicular to the plane formed by the striking motion. The striker blade 5, pivotally mounted about pivot axis 4, freely rotates within the area enclosed by loop 2.

Reinforcing element 3 is an additional layer of wire mesh which is folded about the pivot axis 4 and is attached to the striker blade 5. The reinforcing element 3 strengthens the blade at the point of most wear, i.e., the pivot axis. The swatter blade 5 usually has folded about its marginal edges a tape 6 which is stitched to the blade.

Referring now to FIG. 2, it can be seen the reinforcing element 3 is a piece of folded wire mesh.

FIG. 3 is a cross-sectional view I—I taken perpendicular to the pivot axis 4 and shows wire mesh folded about itself to form striker blade 5 with the reinforcing element 3 folded around the pivot axis 4 and held to the blade by stitching 7.

FIG. 4 is a modification of this invention in which the loop, instead of being a continuous wire, is broken forming separate legs 8 and 9 which are bent to form branches 10 and 11. Wire mesh is then fitted around the branches 10 and 11 with the branches adapted to fit between the layers of wire mesh forming swatter blade 5 which is shown in outline form. The advantage of this modification is that the swatter blade is detachably mounted and can be removed and replaced with another swatter blade simply by spreading legs 8 and 9.

The handle may be wood, metal or simply an extension of twisted wire. The wire forming the loop should be firm but in the case of the alternate construction should be flexible enough to allow the branches to be withdrawn from their positions between the layers of wire mesh. The loop is generally rectangular in shape but may be generally circular or generally trapezoidally shaped. Wire mesh has been depicted as forming the striker blade although it may be made of any material such as rubber normally found in swatter blades.

I claim:

1. An insect swatter comprising: (a) a handle; (b) an enclosed loop attached to one end of said handle; (c) a striker blade pivotably mounted on said enclosed loop and adapted to rotate 360° within said loop.

2. An insect swatter according to claim 1 in which the striker blade is pivotally mounted on the loop along an axis perpendicular to the handle.

3. An insect swatter according to claim 2 in which the enclosed loop is trapezoidal in shape.

4. An insect swatter according to claim 3 in which the striker blade is constructed of wire mesh.

5. An insect swatter according to claim 4 in which the swatter blade has marginally taped edges.

6. An insect swatter according to claim 5 which contains in addition a wire mesh reinforcing element folded about the pivot axis and attached to the striker blade.

7. An insect swatter comprising:
   a. a handle;
   b. a trapezoidally shaped loop, the large base of which is attached to one end of said handle;
   c. a rectangularly shaped wire mesh striker blade having marginally taped edges pivotally mounted on the small base of the trapezoidally shaped loop and adapted to rotate within the loop.

8. An insect swatter according to claim 1 wherein the loop is formed from separate legs upon which the striker blade is pivotably mounted.

* * * * *